United States Patent
Walisko et al.

(10) Patent No.: US 12,549,049 B2
(45) Date of Patent: Feb. 10, 2026

(54) INSULATION ARRANGEMENT FOR A STATOR OF AN ELECTRIC MOTOR

(71) Applicant: Hanon Systems, Daejeon (KR)

(72) Inventors: David Walisko, Hürth (DE); Florian Semmler, Cologne (DE); Jürgen Wawer, Mechernich (DE)

(73) Assignee: HANON SYSTEMS, Daejeon (KR)

( * ) Notice: Subject to any disclaimer, the term of this patent is extended or adjusted under 35 U.S.C. 154(b) by 261 days.

(21) Appl. No.: 18/449,164

(22) Filed: Aug. 14, 2023

(65) Prior Publication Data

US 2024/0097517 A1  Mar. 21, 2024

(30) Foreign Application Priority Data

Sep. 15, 2022 (DE) .......................... 102022123605.6
Jul. 6, 2023 (DE) .......................... 102023117797.4

(51) Int. Cl.
*H02K 3/32* (2006.01)
*H02K 15/10* (2006.01)

(52) U.S. Cl.
CPC ............. *H02K 3/32* (2013.01); *H02K 15/105* (2013.01)

(58) Field of Classification Search
CPC ............................... H02K 3/32; H02K 15/105
USPC ....................................................... 310/179
See application file for complete search history.

(56) References Cited

U.S. PATENT DOCUMENTS

| | | | |
|---|---|---|---|
| 4,160,926 A * | 7/1979 | Cope ...................... | H02K 3/345 428/95 |
| 6,034,461 A * | 3/2000 | Sun ...................... | H02K 1/148 310/216.115 |
| 8,779,641 B2 * | 7/2014 | Fujii ...................... | H02K 29/08 310/68 B |
| 2006/0012261 A1 * | 1/2006 | Ku .......................... | H02K 3/345 310/67 R |
| 2007/0252487 A1 * | 11/2007 | Fujii ...................... | H02K 1/146 310/68 B |
| 2015/0008784 A1 * | 1/2015 | Kitaji ...................... | H02K 5/161 310/215 |
| 2017/0104378 A1 * | 4/2017 | Dawson .................. | H02K 3/522 |
| 2020/0366149 A1 * | 11/2020 | Walisko ................ | H02K 3/345 |

(Continued)

FOREIGN PATENT DOCUMENTS

| | | |
|---|---|---|
| JP | 3819350 B2 | 9/2006 |
| JP | 5297364 B2 | 9/2013 |

(Continued)

OTHER PUBLICATIONS

Morida et al, English Machine Translation of JP2017112721 (Year: 2017).*

*Primary Examiner* — Rashad H Johnson
(74) *Attorney, Agent, or Firm* — Shumaker, Loop & Kendrick, LLP; James D. Miller (57) ABSTRACT

An insulation arrangement for the stator of an electric motor with several stator coils, wherein a respective coil separating element is arranged between adjacent stator coils and the coil separating elements are respectively connected at their ends via an annular lower coil separating element connector and an annular upper coil separating element connector, wherein the connection of the coil separating elements to the coil separating element connectors is embodied as a positive latching connection in combination with an electrically insulating material connection.

10 Claims, 6 Drawing Sheets

(56) References Cited

U.S. PATENT DOCUMENTS

| | | | |
|---|---|---|---|
| 2021/0320538 A1* | 10/2021 | Lin | H02K 3/493 |
| 2024/0097517 A1* | 3/2024 | Walisko | H02K 3/32 |

FOREIGN PATENT DOCUMENTS

| | | |
|---|---|---|
| JP | 7081211 B2 | 6/2022 |
| KR | 1020200131767 A | 11/2020 |

* cited by examiner

INSULATION ARRANGEMENT FOR A STATOR OF AN ELECTRIC MOTOR

CROSS REFERENCE TO RELATED PATENT APPLICATIONS

This patent application claims the benefit of and priority to German Patent Application No. 10 2023 117 797.4 filed on Jul. 6, 2023 and German Patent Application No. 10 2022 123 605.6 filed on Sep. 15, 2022, the entire contents of each of which are incorporated herein by reference.

FIELD

The invention relates to an insulation arrangement for the stator of an electric motor. The electric motor has several stator coils which are electrically insulated from one another. Depending on the voltage ranges for which the electric motors are constructed, different requirements are set for the electrical insulation of the individual coils with respect to one another.

BACKGROUND

An area of application for the insulation arrangement according to the invention is, for example, for electric motors for driving refrigerant compressors in hermetic refrigerant systems. Such electric motors are employed for refrigerant compressors in motor vehicles, in particular in motor vehicle air-conditioning systems.

Due to the high voltage range of up to 1000 volts, the requirements for an electric refrigerant compressor are very high. There is a number of international standards on the basis of which the creepage paths and the air paths between two phases and voltage-free metal parts are carried out. Due to the available reduced installation space for realising a motor/stator, special measures are required for realising a corresponding insulating material system with regard to the required insulation coordination.

An air path is the direct distance by air between two electrically conductive parts, such as two coils. Furthermore, an air path is defined as a distance from a conductive part to a voltage-free metal part, for example the stator core.

In contrast, a creepage path is a current-conducting path across the surface which builds up over the course of the operating time. It designates the shortest path over the surface between electrically conductive parts or to the next voltage-free metal part.

In electric motors which are operated in a voltage range of approximately 400 volts, significantly shorter air paths and creepage paths are embodied.

The fulfilment of the requirements for electric motors in voltage ranges of up to 1000 volts thus represents a multiplication or significant increase of these common distances. On the other hand, a compact design of the components is indispensable, in particular in mobile applications, such as in motor vehicle air-conditioning systems.

In the prior art, stator coils of electric motors of refrigerant compressors are already electrically insulated by coil separating elements mounted in the axial direction. However, the disk-like, axially arranged coil separating elements do not solve the problem of extended creepage and air paths in ultra-high-voltage applications of up to 1000 V.

An insulation arrangement for an electric motor of an electric compressor is known from DE 10 2019 112 534. The insulation arrangement is provided for an electric motor with a stator core of the type described at the beginning. According to this construction of the stator core, electrical line wires are wound up on the coil carriers, which extend radially inwards from the inner circumference of the stator ring with their inner flange formed at the head end, in order to form coils, wherein there is an intermediate space—called the stator groove by experts—between adjacent coils. In these intermediate spaces of the coils arranged radially on the inner circumference of the stator, a respective coil separator in the form of a plate-shaped element is arranged, which extends from the inner circumference of the stator in the radial direction inwards and in the axial direction between the axial end faces of the stator. A special feature of these coil separators is that they have an inwardly directed Y-shape in cross-section perpendicular to the longitudinal direction, wherein a respective fork end of the Y-shape delimits the intermediate space between adjacent coils on an axial longitudinal side of the opposite inner flanges of the coil carriers. Within the stator grooves, the coil separators are held in position pressed in by elastic deformation. The axial longitudinal sides at the foot end of the Y-shape press against the inner surface of the stator ring and the head ends respectively press against the axial longitudinal sides of the opposite inner flanges of the coil carriers of the stator core.

The production and mounting of the known coil separators are comparatively complicated because of the Y sectional shape. Further, it has been shown that a simple pressing of the coil separators against the components of the stator core is not sufficient to eliminate a possible current path for the leakage current flow. Thus, the danger of a gap between the aligned and adjacent components of the stator arrangement and accordingly the danger of creepage paths and undesirable current flows remains.

SUMMARY

The object of the invention is thus to provide an insulation arrangement which meets the requirements for the use of a voltage range of up to 1000 volts and at the same time realises sufficient creepage and air paths in order to meet international standards and specifications.

The object is achieved by a subject matter and a method as shown and described herein.

The object of the invention is achieved, in particular, by an insulation arrangement for the stator of an electric motor with several stator coils, wherein a respective coil separating element is arranged between adjacent stator coils and the coil separating elements are respectively connected at their ends via an annular lower coil separating element connector and an annular upper coil separating element connector. The connection of the coil separating elements to the coil separating element connectors is embodied as a positive latching connection in combination with an electrically insulating material connection.

The concept of the invention is that an increased insulation effect in ultra-high-volt applications cannot be realised by merely pushing two parts on top of one another in order to eliminate a potential path for a leakage current flow. It is the nature of a mechanical connection that as a rule a gap will remain between two connected parts. In order now to eliminate the potential paths for the leakage current, a material connection must be established between the mechanically connected parts. This means that the insulating elements which are arranged adjacent to one another are, for example, glued, soldered, welded or vulcanised to one another in order to eliminate creepage current paths in accordance with international standards and to establish corresponding air paths.

The design solution of the problem consists in a construction in which preferably the bonding of the connections of adjacent parts leads to the closing of potential paths, also referred to as creepage paths, and thus to the fulfilment of the international standards for the creepage current flow.

The material connection of critical regions by pouring or gluing is an additional instrument for avoiding inadequate creepage paths. By using the coil separators in combination with the coil separating element connectors, the air path between two coils is selected correspondingly larger than the direct distance between the coil wires or from coil to the voltage-free metal parts, as in accordance with the requirements of internationally valid standards, as a result of which the requirements of the international standards can be met.

The material connection is carried out with a suitable casting material or adhesive, such as epoxy resin or a suitable adhesive.

Because of the crown-like coil separating element connectors, path lengths for creepage paths are obtained which correspond to the required ISO coordination and are in part higher than the required international standards.

In terms of construction, the concept of the invention is realised in that the coil separating elements are designed in such a way that they are respectively connected at their ends to an upper and a lower coil separating element connector in a positive and material fit.

The upper and lower coil separating element connectors are advantageously formed in the axial direction in the type of a crown, a cylindrical element with serrated extensions.

The coil separating element connectors, which are also referred to as crowns, are designed in such a way that they ensure sufficient air and creepage paths to the rotating assembly of rotor and shaft.

In order to ensure a proper press fit in the slot opening, the slot separators are constructed in such a way that they have a certain oversize. As soon as the coil separating elements, also referred to as slot separators, are brought into position during mounting, the press fit ensures that the coil separating elements can no longer move substantially during further mounting and handling in operation.

After the mounting of the coil separating elements, the upper and lower coil separating element connectors are placed on the stator and connected to the coil separating elements.

After the assembly of other parts, which are required for the insulation system but are not essential for the invention, the stator is treated with a vacuum pressure impregnation in order to establish the material connections in all contact regions between the stator encapsulation, the coil separating element and the coil separating element connectors.

The design of the insulation arrangement of the three basic elements of coil separating element, upper coil separating element connector and lower coil separating element connector, as well as their material connection, create a widening of the air and creepage paths. With the material connections, the critical air and creepage paths are completely eliminated and others widened to meet the requirements for the voltage level with which the motor is operated in the corresponding application case.

According to the invention, the tooth front of the stator encapsulation is designed with the additional upper and lower coil separating element connectors in such a way that a structurally ideal winding situation is ensured.

After the stator has left the winding machine, the upper and lower coil separating element connectors are placed on top in order to increase the air and creepage paths after the adhesive connections between the contacting regions have been established by suitable methods.

Particularly preferably, the coils are electrically insulated from one another over the entire axial length by the use of a suitable material for establishing the material connections to the coil separating elements, so that no current can flow from one coil to the other or from one coil to the stator core in the interior between the upper and the lower coil separating element connectors.

Thus, for a potential creepage path or a corona, only the path over the upper side of the coil separating element connectors remains, which is each executed in its length in accordance with international requirements.

Advantageously, the coil separating element connectors are formed to be cylindrical with serrated axially extending guide elements for the coil separating elements.

Particularly advantageously, the coil separating elements are formed with a guide element receiving region in the end-side regions facing the coil separating element connectors.

The coil separating element preferably has a latching element receptacle and the coil separating element connector has a corresponding latching element, wherein the latching connections are formed acting in the radial direction.

The latching connection is advantageously formed by a latching element receptacle on the coil separating element and a latching lug as a latching element on the coil separating element connector. In addition, a guide groove for axial guidance is formed in the coil separating element connector.

Advantageously, the latching lug is formed as a web and the latching element receptacle is formed as a groove corresponding to one another in the adjacent components.

The adhesive connection for establishing the material connection between the elements of the insulation arrangement is preferably embodied with epoxy resin.

The embodiment of a press fit between the guide elements of the coil separating element connection and the guide element receiving regions of the coil separating elements is particularly preferred.

Preferably, contact surface widening regions for larger-area adhesive regions are formed between the guide elements.

The object of the invention is further achieved by a method for mounting an insulation arrangement in a stator of an electric motor, in particular of an electric motor of an electric compressor, wherein the plate-shaped coil separating elements are respectively positioned in the axial direction at the end between the lower coil separating element connector and the upper coil separating element connector and thereby enter into a latching connection, wherein an electrically insulating substance is introduced into contact regions between the plate-shaped coil separating elements and the lower coil separating element connector and the upper coil separating element connector, which substance forms a material connection between the plate-shaped coil separating elements and the lower coil separating element connector and the upper coil separating element connector.

According to the concept, a material connection is formed which consists of an electrically insulating substance. Thus, a material connection according to the invention is always embodied to be electrically insulating.

The electrically insulating substance is preferably introduced by means of a vacuum pressure process method for producing the material connection.

BRIEF DESCRIPTION OF DRAWINGS

Further details, features and advantages of designs of the invention will become apparent from the following description of exemplary embodiments with reference to the accompanying drawings. Wherein.

DESCRIPTION OF AN EMBODIMENT

FIGS. 1 to 5 show an embodiment of an insulation arrangement according to the prior art, as is commonly designed for electric motors in the voltage range of up to approximately 400 volts.

Figure 1:
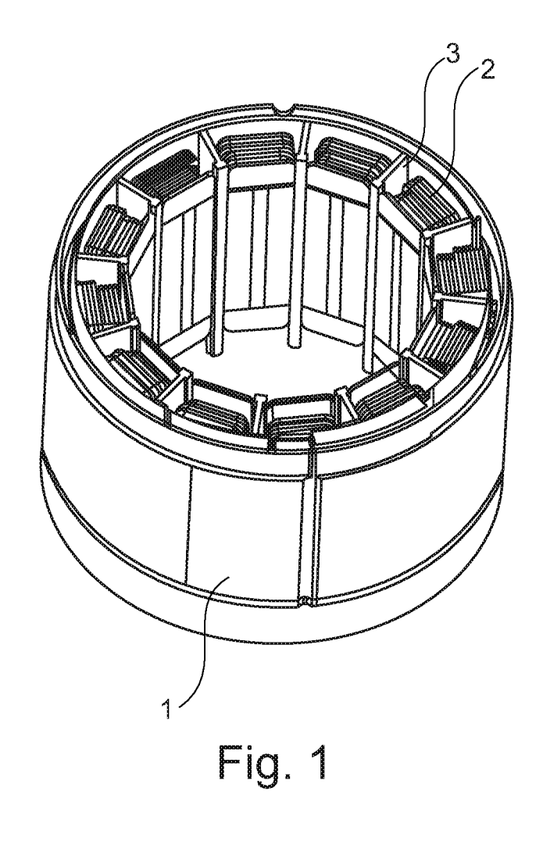
FIG. 1: stator perspective from below.
Figure 2:
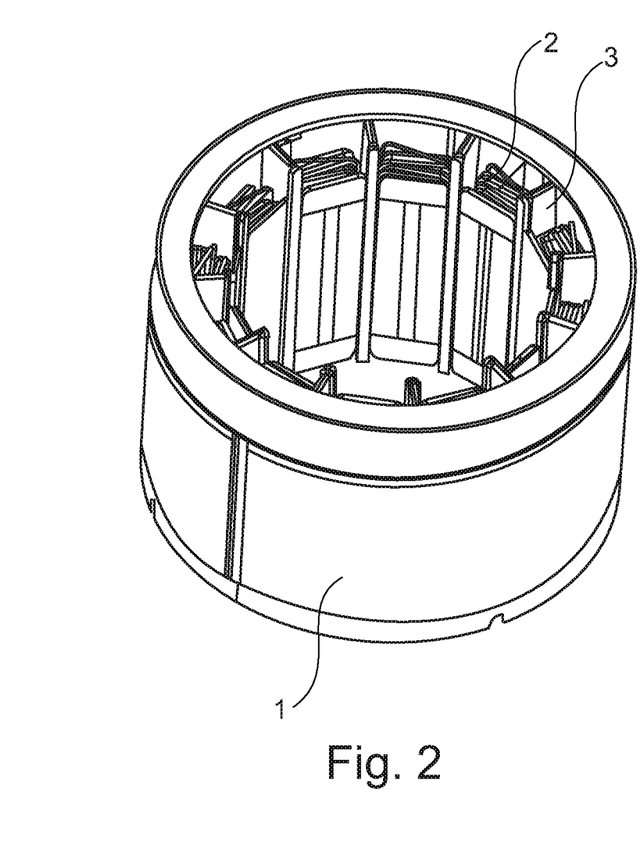
FIG. 2: stator perspective from above.

The stator 1 is provided with various stator coils 2 on the circumferential side, wherein the stator coils 2 are each electrically insulated from one another by the coil separating elements 3. The coil separating elements 3 are arranged axially in the longitudinal direction on the circumferential side and prevent the contact of the individual coils and the non-voltage-carrying metal parts with one another. In the example shown, twelve stator coils 2 are arranged equidistantly in the stator 1 on the circumference of the approximately circular-cylindrical stator 1, which are electrically insulated from one another by twelve coil separating elements 3.

Figure 3:
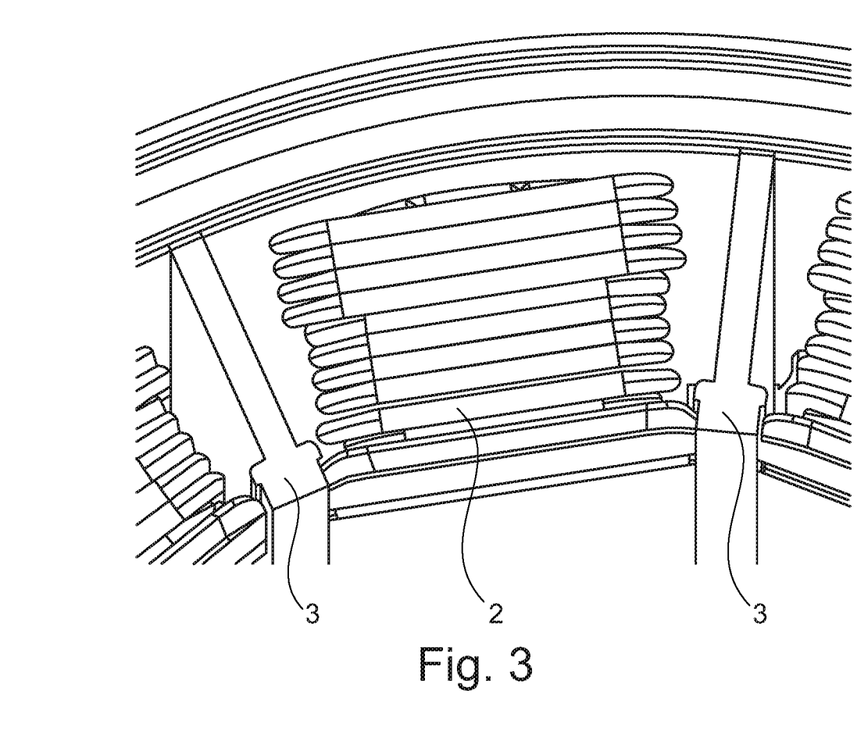
FIG. 3: stator coil with adjacent coil separating elements.
Figure 4:
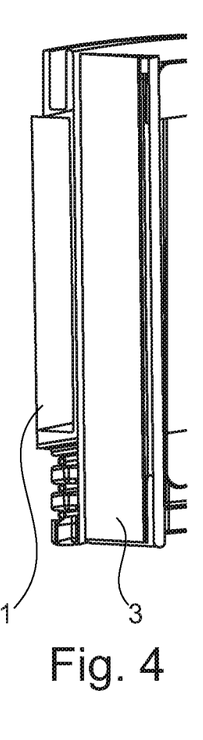
FIG. 4: coil separating element in longitudinal section.
Figure 5:
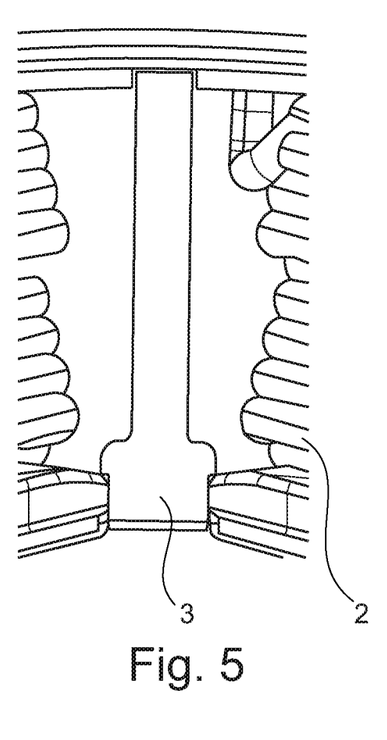
FIG. 5: coil separating element in plan view.
Figure 6:
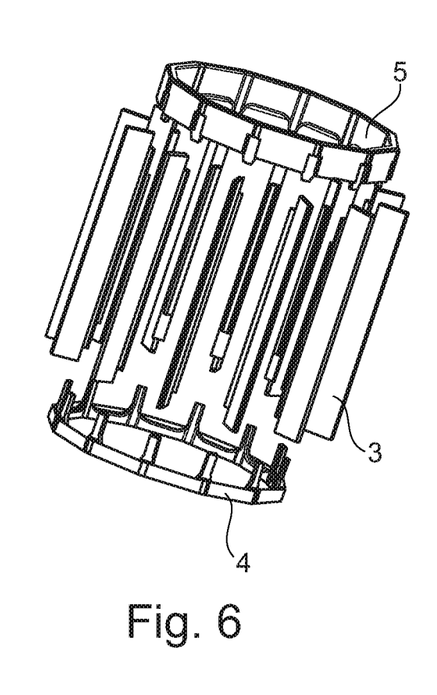
FIG. 6: insulation arrangement in explosive representation.

FIGS. 3, 4 and 5 show details of the design according to the prior art. In FIG. 3, a stator coil 2 with adjacent coil separating elements 3 on both sides is represented, FIG. 4 shows a coil separating element 3 in the longitudinal section of the stator 1, and FIG. 5 shows a coil separating element 3 in plan view, wherein the T-shaped cross-section of the coil separating element 3 becomes visible according to the prior art.

FIGS. 6, 9, 10 and 12 respectively show the insulation arrangement according to the invention consisting of several coil separating elements 3 and a lower coil separating element connector 4 and an upper coil separating element connector 5 bounding the ends thereof. The representations are partly as an explosive representation or in a partly or completely assembled state in a respective perspective view.

Figure 9:
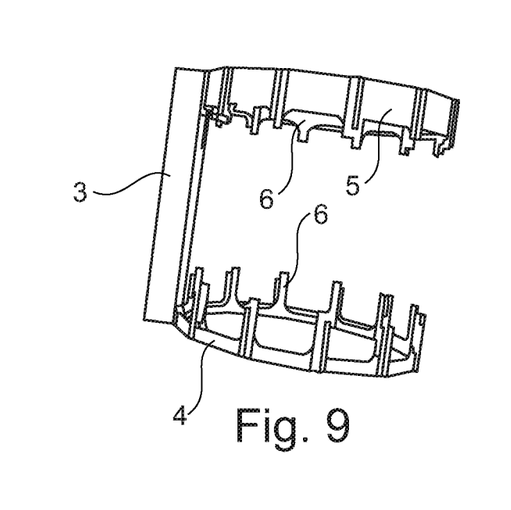
FIG. 9: insulation arrangement perspective with two coil separating elements.
Figure 10:
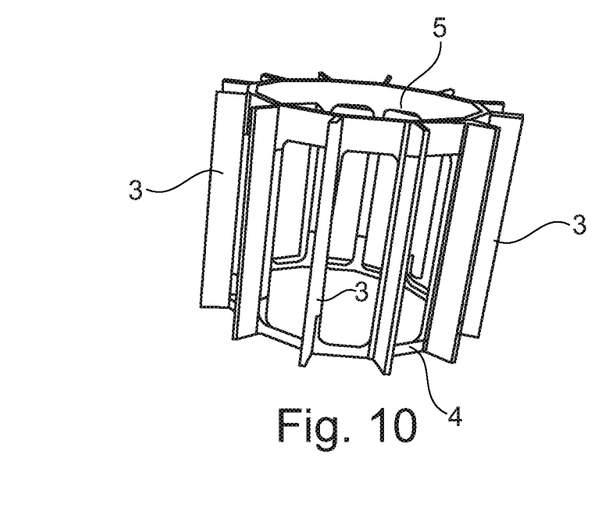
FIG. 10: insulation arrangement perspective in the mounted state.
Figure 15:
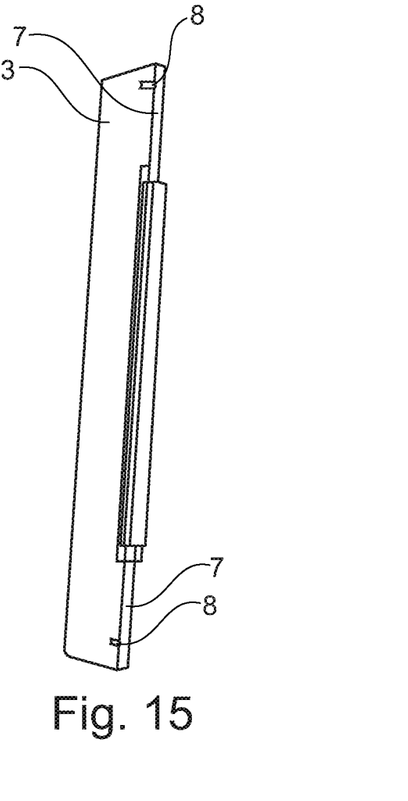
FIG. 15: coil separating element.

In FIG. 9, it is additionally characterised that the upper and lower coil separating element connectors 4, 5 respectively have guide elements 6 which impart a respective crown-like appearance through the serrated design of the guide elements 6 to the cylindrical design of the coil separating element connectors 4, 5. In the mounted position, the guide elements 6 of the coil separating element connectors 4, 5 face each other since the guide elements 6 are formed to correspond to the guide element receiving regions 7 of the coil separating elements 3, as represented in FIG. 15.

Figure 7:
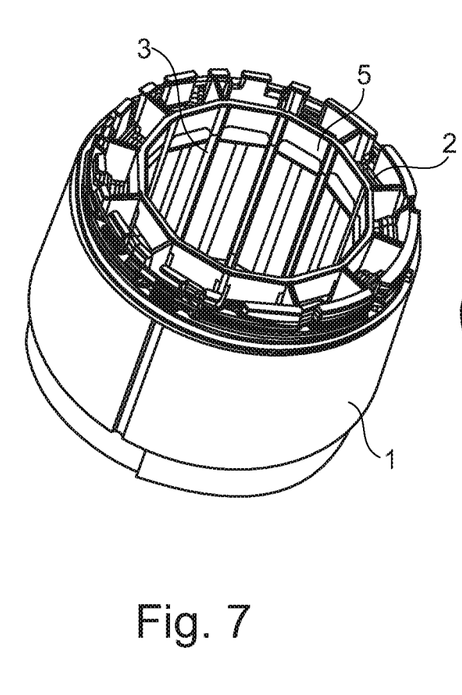
FIG. 7: stator perspective from below.
Figure 8:
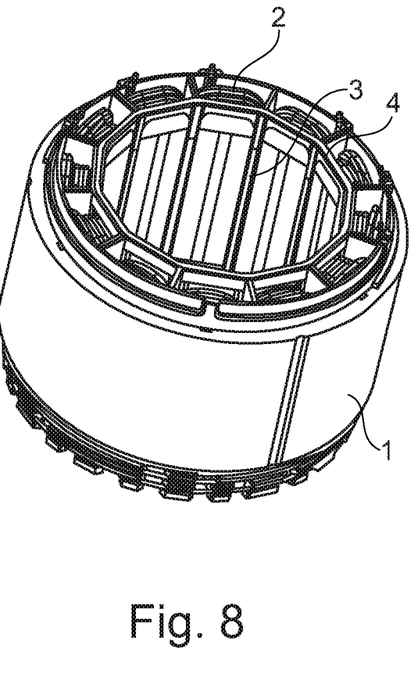
FIG. 8: stator perspective from above.
Figure 11:
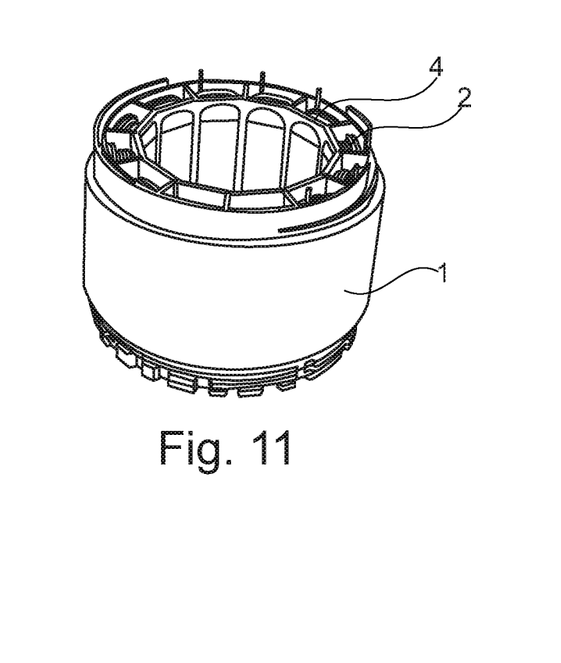
FIG. 11: stator with insulation arrangement.
Figure 12:
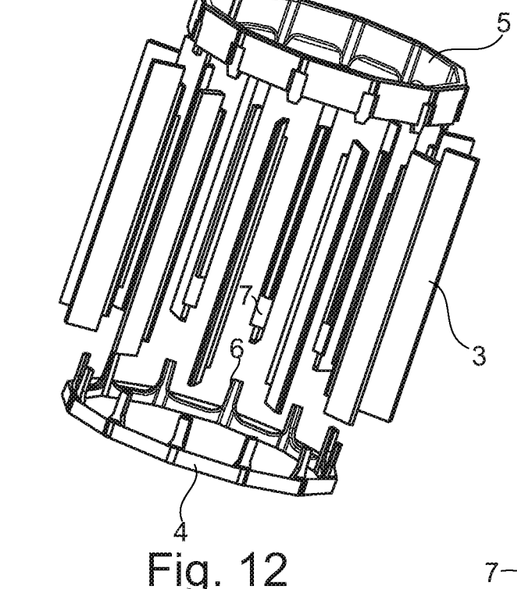
FIG. 12: perspective insulation arrangement with the three main components.

FIGS. 7, 8, 11 each show the stator 1 in perspective views obliquely from below or obliquely from above. It should be mentioned that the coil separating element connectors 4, 5 are also referred to as crowns, wherein the specific dimensions are not fixed but vary from application to application when the stator design changes. The coil separating elements 3 are similar in function to those of the prior art. However, they were specially constructively adapted to the connection to the coil separating element connectors 4, 5. After the stator 1 has left the station of the winding machine during mounting, the parts of the insulation arrangement are installed in the stator 1, wherein the mounting sequence is not significant. By way of example, the coil separating elements 3 are first placed in the stator 1 and subsequently the lower coil separating element connector 4 and the upper coil separating element connector 5 are mounted.

The individual elements of the insulation arrangement are provided with a suitable adhesive which adhesively bonds the contact surfaces between the three parts and the stator 1, wherein the requirements for insulation are met by the contact surfaces being bonded to one another over the entire surface and to the stator 1.

Figure 13:
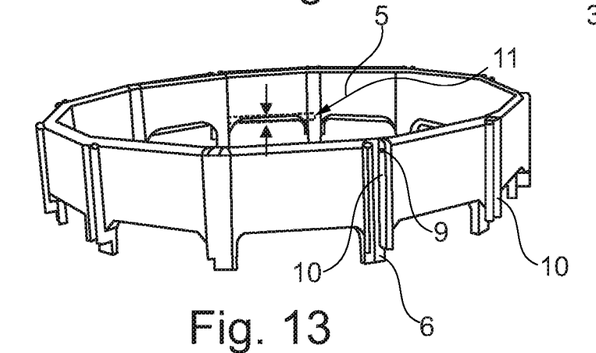
FIG. 13: upper coil separating element connector.

In FIG. 13, an upper coil separating element connector 5 is represented in perspective. The basic shape of the upper coil separating element connector 5 is a cylindrical ring which is embodied as a dodecagon with twelve corners. In the corners, the guide elements 6 are arranged as serrated axial widenings of the crown. Guide grooves 10 for the coil separating elements 3, which form a press fit with the coil separating elements 3, are formed in the corners. Between the guide elements 6, contact surface widening regions 11 for large-area adhesive regions are formed, which increases the robustness of the construction. The guide elements 6 with the guide grooves 10 of the upper coil separating element connector 5 have latching lugs as latching elements 9 in the upper region corresponding to the latching element receptacles 8 of the coil separating elements 3 represented in FIG. 15.

Figure 14:
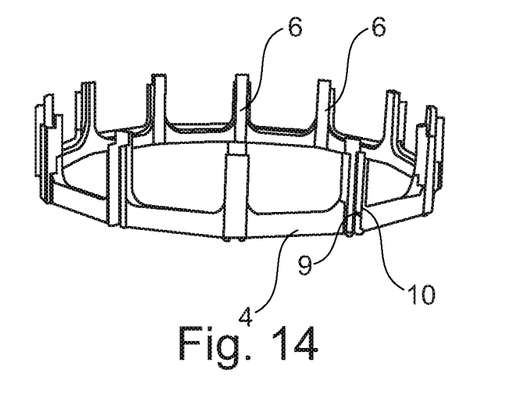
FIG. 14: lower coil separating element connector.

In FIG. 14, a lower coil separating element connector 4 is represented in perspective. Here, the serrated guide elements 6 point upwards. The guide grooves 10 for receiving and guiding the coil separating elements 3, on the other hand, produce a press fit, which facilitates the mounting of the insulation arrangement. Corresponding to the lower latching element receptacles 8 of the coil separating elements 3 of FIG. 15, latching lugs are arranged as latching elements 9 in the lower region of the guide elements 6.

In FIG. 15, a coil separating element 3, which at its ends shows a respective latching element receptacle 8 at the top and bottom, is shown. These correspond to the latching elements 9 of the lower and upper coil separating element connectors 4 and 5. Furthermore, the guide element receiving region 7 is represented, which receives the serrated guide elements 6 of the lower and upper coil separating element connector.

Figure 16:
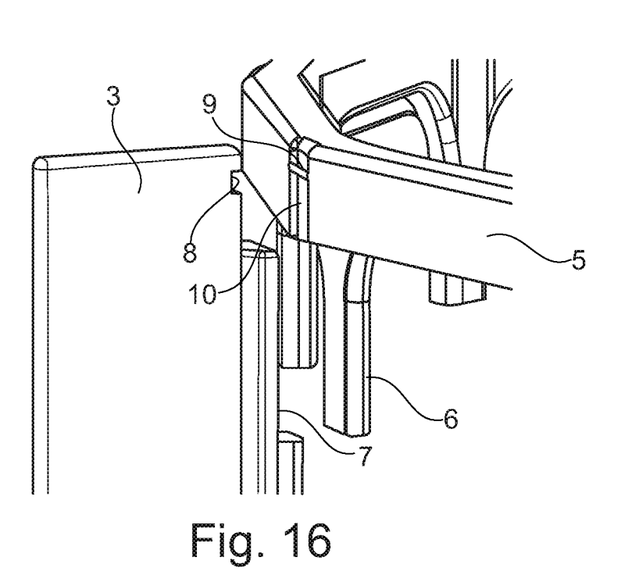
FIG. 16: detailed coil separating element and coil separating element connector.

In FIG. 16, the connection of the coil separating element 3 to the upper coil separating element connector 5 is represented in detail and enlarged. The upper coil separating element connector 5 is represented with the serrated extension of the guide element 6, wherein it is indicated that a guide element receiving region 7 is formed on the coil separating element 3 corresponding to the guide element 6. The guide element receiving region 7 receives the guide element 6. In the case of a radially inwardly directed movement for mounting, the coil separating element 3 engages at its ends in the guide groove 10 of the upper coil separating element connector 5 provided with a latching element receptacle 8. A latching connection between the latching lug 9 of the upper coil separating element connector 5 and the correspondingly formed latching element receptacle 8 on the coil separating element 3 is thereby produced.

Figure 17:
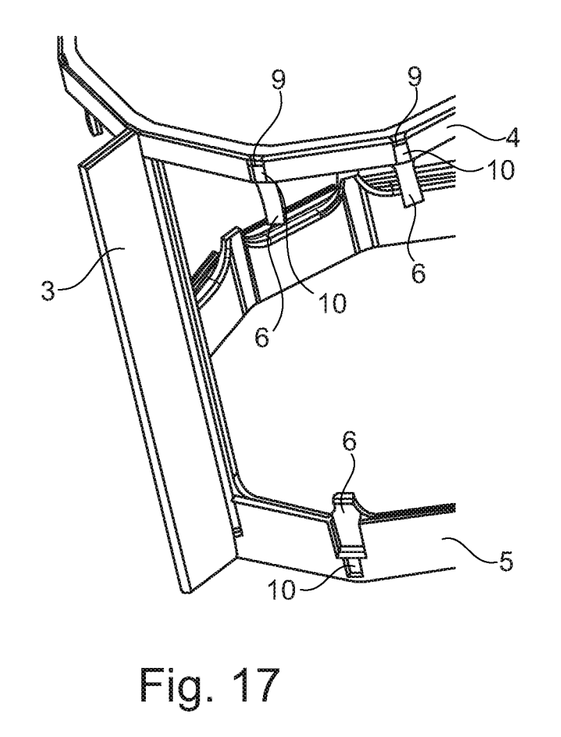
FIG. 17: detailed coil separating element connector and coil separating element.

In FIG. 17, the connection situation after the first connection of a coil separating element 3 to the lower coil separating element connector 4 and the upper coil separating element connector 5 is represented. The guide elements 6 on the upper and lower coil separating element connectors 4, 5 are directed towards one another and are attached to the coil separating element 3 by the respective guide element receiving regions 7 and are connected thereto. The guide groove 10 on the upper and lower coil separating element connector 4, 5 shows or has a press fit in combination with the corresponding region on the coil separating element 3, such that a moderately loadable press fit connection is created during mounting already before the actual latching connection.

LIST OF REFERENCE NUMERALS

1 Stator
2 Stator coil
3 Coil separating element
4 Lower coil separating element connector
5 Upper coil separating element connector
6 Guide element
7 Guide element receiving region
8 Latching element receptacle
9 Latching element
10 Guide groove
11 Contact surface widening region

What is claimed is:

1. An insulation arrangement for a stator of an electric motor with a plurality of stator coils, wherein a respective one of coil separating elements is arranged between adjacent ones of the stator coils and the coil separating elements are respectively connected at ends thereof via annular lower coil separating element connectors and annular upper coil separating element connectors, wherein connection of the coil separating elements to the lower coil separating element connectors and the upper coil separating element connectors is embodied as a positive latching connection in combination with an electrically insulating material connection, wherein the lower coil separating element connectors and the upper coil separating element connectors are formed to be cylindrical with serrated axially extending guide elements for the coil separating elements, and wherein the guide elements of the lower coil separating element connectors and the upper coil separating element connectors are spaced from each other and the part of the coil separating element is disposed between the guide elements of the lower coil separating element connectors and the upper coil separating element connectors.

2. The insulation arrangement according to claim 1 wherein the coil separating elements have a guide element receiving region in end regions facing the lower coil separating element connectors and the upper coil separating element connectors.

3. The insulation arrangement according to claim 2, wherein the guide elements of the lower coil separating element connectors and the upper coil separating element connectors and the guide element receiving region of the coil separating elements are embodied in a press fit.

4. The insulation arrangement according to claim 1, wherein the coil separating element has a latching element receptacle and the lower coil separating element connectors and the upper coil separating element connectors have a corresponding latching element, wherein the latching connection is formed acting in a radial direction.

5. The insulation arrangement according to claim 1, wherein the latching connection is formed by a latching element receptacle on the coil separating element and a latching element embodied as a latching lug on the lower coil separating element connectors and the upper coil separating element connectors, wherein a guide groove for axial guidance is additionally formed in the lower coil separating element connectors and the upper coil separating element connectors.

6. The insulation arrangement according to claim 5, wherein the latching lug is formed as a web and the latching element receptacle is formed as a groove in a corresponding manner.

7. The insulation arrangement according to claim 1, wherein the material connection is embodied with epoxy resin.

8. The insulation arrangement according to claim 1, wherein contact surface widening regions for larger-area adhesive regions are formed between the guide elements.

9. A method for mounting the insulation arrangement according to claim 1 in the stator of the electric motor, wherein the plate-shaped coil separating elements are respectively positioned in an axial direction at the ends between the lower coil separating element connectors and the upper coil separating element connectors and thereby enter into the latching connection, wherein an electrically insulating substance which forms the material connection between the plate-shaped coil separating elements and the lower coil separating element connectors and the upper coil separating element connectors is introduced into contact regions between the plate-shaped coil separating elements and the lower coil separating element connectors and the upper coil separating element connectors.

10. The method according to claim 9, wherein the electrically insulating substance is introduced by a vacuum pressure process method.

* * * * *